S. J. SAMPSON.
VEHICLE BRAKE.
APPLICATION FILED FEB. 19, 1912.
1,041,356.
Patented Oct. 15, 1912.
2 SHEETS—SHEET 1.
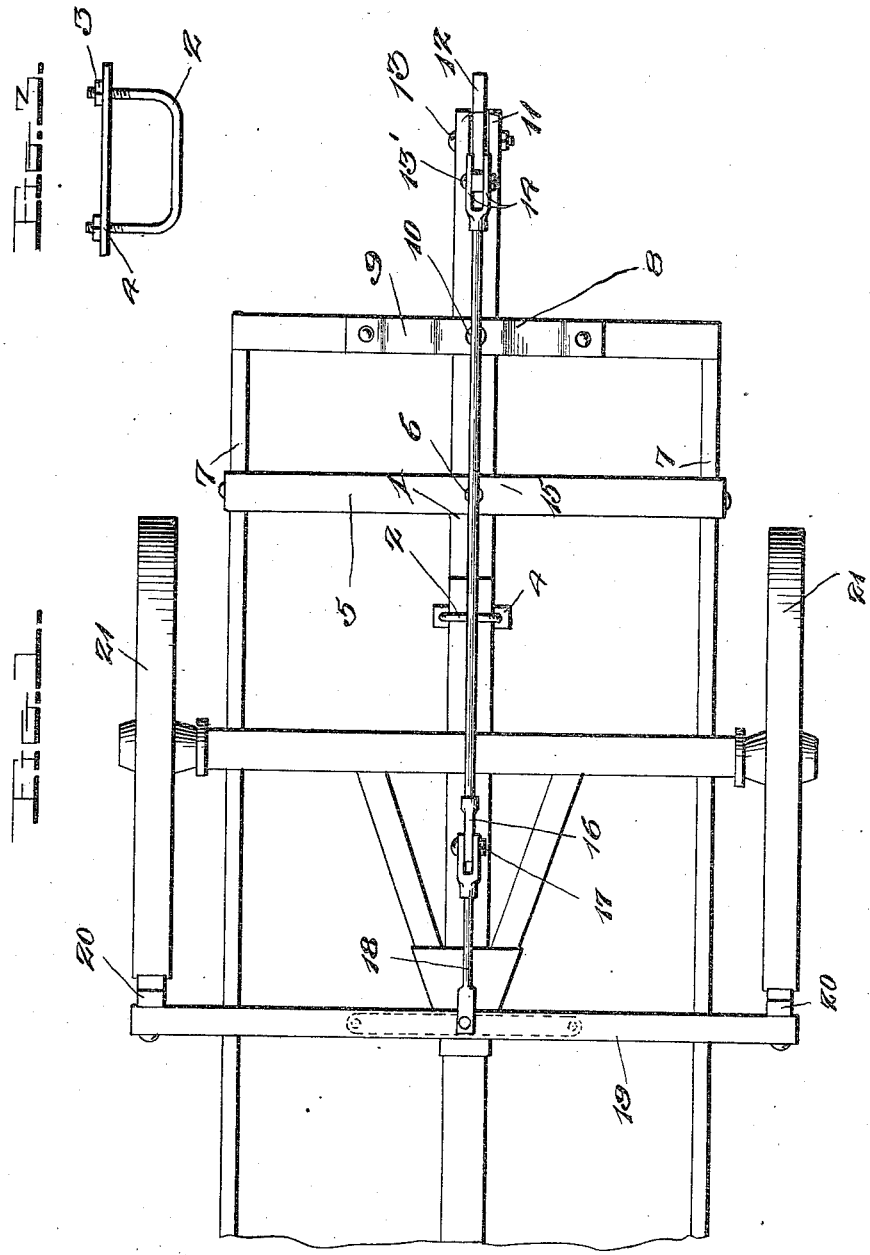
Witnesses
Chas. L. Griesbauer.
A. B. Norton.
Inventor
S. J. Sampson,
By Watson E. Coleman
Attorney

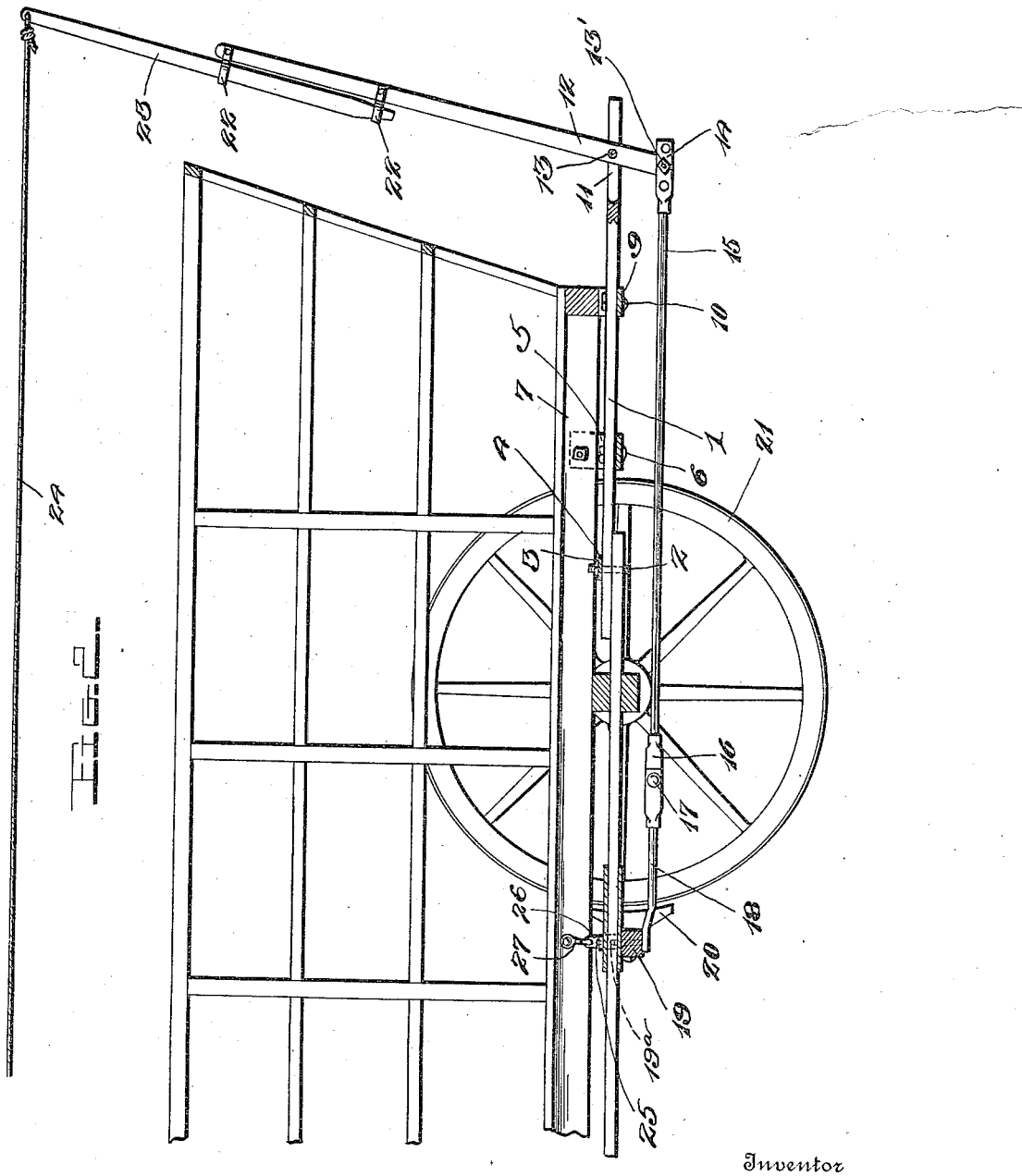

UNITED STATES PATENT OFFICE.

SAMUEL J. SAMPSON, OF MANNING, NORTH DAKOTA.

VEHICLE-BRAKE.

1,041,356.  Specification of Letters Patent.  Patented Oct. 15, 1912.

Application filed February 19, 1912. Serial No. 678,521.

*To all whom it may concern:*

Be it known that I, SAMUEL J. SAMPSON, a citizen of the United States, residing at Manning, in the county of Dunn and State of North Dakota, have invented certain new and useful Improvements in Vehicle-Brakes, of which the following is a specification, reference being had to the accompanying drawings.

This invention comprehends certain new and useful improvements in vehicle brakes and relates particularly to an improved construction of brake designed for use on hay racks or wagons whereby the driver may operate the brake while driving the team and without the necessity of climbing down from the driver's seat so as to operate the brake from the rear of the load.

The invention has for one of its main objects a simple, durable and efficient brake of this character which may be easily applied to any conventional hay wagon or rack without any material changes therein and the invention also aims to generally improve this class of devices and render them more useful and commercially desirable.

With these and other objects in view as will more fully appear as the invention proceeds, the invention consists in certain constructions, arrangements and combinations of the parts that I shall hereinafter more fully describe and claim.

For a full understanding of the invention reference is to be had to the following description and accompanying drawings in which:—

Figure 1 is a bottom plan view of the rear portion of a rack or wagon equipped with my improved brake operating mechanism. Fig. 2 is a side elevation thereof with parts in section; and Fig. 3 is a detail view of a clip hereinafter specifically referred to.

Corresponding and like parts are referred to in the following description and designated in the accompanying drawings by like reference characters.

It is to be understood that one of the primary objects of my invention is to provide a brake mechanism for hay racks or wagons which may easily be applied to the vehicle without the necessity of materially altering the latter.

In carrying out my invention I provide a beam 1 which is disposed longitudinally underneath the rack, the forward end of the beam 1 being clamped to the reach of the wagon if the reach is long enough for this purpose, by means of a U-shaped clip 2 the upper ends of which are threaded to receive nuts 3 adapted to clamp down upon the reach a locking bar or gland 4. In addition to the clamp 2, or as a substitute therefor if the wagon reach is not long enough to use the clamp 2, I provide a transversely extending supporting strap 5 which is bolted to the beam 1 near the front end of the latter as at 6, the ends of the supporting bar 5 being bolted or otherwise secured to the sides 7 of the rack frame, underneath the latter.

Intermediate of its ends and preferably near the rear end, the beam 1 passes over the lower cross bar 8 of an angular supporting strap 9, the ends of which are bolted to the rear transverse beam of the wagon framework. The intermediate cross bar 8 of said strap is secured by a bolt 10 to the beam 1, as clearly illustrated in the drawings. By this means the beam 1 is securely held in place with its rear end projecting rearwardly beyond the rear end of the vertical frame.

The rear extremity of the beam 1 is forked as indicated at 11 to receive the lower end of a substantially vertically disposed actuating lever 12, a transverse bolt 13 passing across the bifurcated rear extremity of the beam 1 and being passed through the actuating lever 12 intermediate of the ends of the latter and preferably near the lower end of the lever. The lower extremity of the lever 12 is secured by a bolt 13' or the like in between the forked end 14 of a link rod 15 which extends longitudinally underneath the beam 1. If desired, the rear forked end 14 of the link rod 15 may be formed with a plural number of sets of apertures for the bolt 13' whereby the connection between the link rod 15 and hand lever 12 may be varied, as required. The forward end of the link rod 15 is flattened as indicated at 16 and is provided with a transverse bolt 17 which secures said link rod to the forked rear end of the brake link 18 which is secured to the brake shoes which are carried by the beam 19 and which are designed for frictional engagement with the rear ground or traveling wheels 21.

The actuating lever 12 carries upper and lower rings 22 into which the lower end of an extension rod 23 is adapted to fit, the upper end of said rod being secured to a rope or cable 24 which is designed to extend forwardly over the load, whereby the driver at the front of the load may pull upon the lever 12 so as to apply the brake shoes 20 to the peripheries of the wheels 21, thereby doing away with the necessity of climbing down from the load and walking to the rear of the hay rack to actuate the brake.

From the foregoing description in connection with the accompanying drawings, the operation of my improved brake mechanism for hay racks will be apparent. In the practical use of the device after the parts have been assembled as hereinbefore described, and after the rack or wagon has received its load, the rope or cable 24 is passed forwardly over the load within convenient reach of the driver. Any forward pull upon the rope or cable 24 will draw the actuating lever 12 forwardly and thereby apply the brakes. It is of course to be understood that the weight of the lever 12 with its extension, or the weight of the lever itself, may be sufficient to normally hold the brake shoes in inoperative positions.

Preferably, the brake beam 19 is provided with bolts 19$^a$ by which it is engaged in any of the apertures 25 of plates 26 which are pivotally suspended from the sides of the rack 7 by means of the suspension rods 27. Thus, the brake beam is properly supported and strains which will otherwise displace or injure the brake beam in heavy hauling, will not, with the present construction, injuriously affect the beam.

Having now described my invention what I claim is:—

A brake mechanism of the character described, including a main supporting beam, a clip secured to the beam near the front end of the latter and arranged for attachment to a vehicle reach, front and rear transversely extending supporting straps secured to the beam in spaced relation to each other and in the rear of and in spaced relation to said clip, said straps being arranged for attachment to a vehicle frame, the rear end of said beam being forked, an actuating lever pivotally mounted intermediate of its ends in the fork of said beam, and a link rod pivotally connected to the lower end of said actuating lever and extending forwardly therefrom and arranged for attachment to a brake beam.

In testimony whereof I hereunto affix my signature in the presence of two witnesses.

SAMUEL J. SAMPSON.

Witnesses:
E. A. EVANS,
H. N. OWENS.

---

Copies of this patent may be obtained for five cents each, by addressing the "Commissioner of Patents, Washington, D. C."